US006898435B2

(12) United States Patent
Milman

(10) Patent No.: US 6,898,435 B2
(45) Date of Patent: May 24, 2005

(54) METHOD OF PROCESSING AND BILLING WORK ORDERS

(76) Inventor: David A Milman, 3843 Sweet Rd., Jamesville, NY (US) 13078

( * ) Notice: Subject to any disclaimer, the term of this patent is extended or adjusted under 35 U.S.C. 154(b) by 301 days.

(21) Appl. No.: 10/197,295

(22) Filed: Jul. 16, 2002

(65) Prior Publication Data

US 2004/0014479 A1 Jan. 22, 2004

(51) Int. Cl.[7] .............................................. H04Q 7/20
(52) U.S. Cl. ..................... 455/457; 455/423; 455/419; 455/406; 455/424; 705/7; 705/9; 705/32; 714/1; 379/9; 379/29; 379/10; 379/15; 379/34
(58) Field of Search ................................ 455/452, 423, 455/419, 406; 705/7, 9, 32; 714/1; 379/9, 29, 10, 15, 34

(56) References Cited

U.S. PATENT DOCUMENTS

| | | | |
|---|---|---|---|
| 5,606,497 A | 2/1997 | Cramer et al. | 395/232 |
| 5,615,121 A | 3/1997 | Babayev et al. | 395/209 |
| 5,623,404 A | 4/1997 | Collins et al. | 395/209 |
| 5,953,389 A | * 9/1999 | Pruett et al. | 379/9 |
| 6,144,848 A | 11/2000 | Walsh et al. | 455/419 |
| 6,216,108 B1 | 4/2001 | LeVander | 705/7 |
| 2002/0055358 A1 | * 5/2002 | Hebert | 455/423 |

* cited by examiner

*Primary Examiner*—David Hudspeth
*Assistant Examiner*—David Q Nguyen
(74) *Attorney, Agent, or Firm*—Bernhard P. Molldrem, Jr.

(57) ABSTRACT

Customer calls for maintenance and repair for customer equipment are handled automatically in a computerized network. A central dispatch office receives customer trouble calls. A number of available technicians, in the same geographic location as the customer, can accept the assignment to clear the customer equipment problem. Each of the technicians has a hand-held wireless computing device that communicates wirelessly over the Internet with the main server computer at the central dispatch office. The main server computer automatically creates a service call for each customer problem and these service calls are communicated wirelessly over the Internet to the technician's hand-held device. Various screens on the hand-held device allow the technician enter job completion data, and order parts and equipment, and carry out customer contact maintenance functions. The main server computer invoices and bills the customer for the completed work.

16 Claims, 10 Drawing Sheets

METHOD OF PROCESSING AND BILLING WORK ORDERS

BACKGROUND OF THE INVENTION

This invention concerns systems and techniques for assigning, tracking, and billing of calls for service, maintenance and repair for customer equipment, and for subsequent sales activity or other follow-up services. The invention is more specifically directed to an automated system in which the work assignment and billing information can be processed and transmitted between a central office and field technicians, and involves hand-held communications devices that communicate wirelessly using the Internet with a main server computer at the central office.

Currently, when a customer or potential customer calls in to request maintenance or repair service because of a failure or problem with the customer equipment, network, or software, a telephone dispatcher writes up a work order which is logged in as a service call. Eventually, through some business method, the service call is given to a repair technician, who then schedules a service call visit to the customer site to repair the equipment if possible. It has been difficult to provide service calls to the technician(s) in a manner that is efficient, and which results in prompt customer service. This usually involves having the technician physically present at the dispatcher location to receive the appropriate information about the customer trouble, or else having the technician and dispatcher communicate by voice. There are other problems that have not been addressed in the prior art, such as how the technician can reach the customer's geographical location, how the customer is to make payment for the repair and maintenance service, and how replacement parts for the customer equipment are obtained, delivered, and paid for.

There have been various techniques proposed for facilitating the servicing of equipment in need of repair or other attention. Daniel et al. Published U.S. Pat. Appln. No. US2002/0022984 relates to a computerized method and system for guiding personnel in the servicing of equipment requiring repair while at the equipment work site, e.g., a railroad locomotive in a rail yard. Kardos et al. U.S. Pat. No. 6,345,281 relates to a recovery process in which orders are scheduled by computer and are communicated from a central message handler function to remote station. Hall et al. U.S. Pat. No. 6,026,375 concerns a technique of processing orders from mobile customers that require service. The service order is transmitted to a service provider in the vicinity of the customer location, and the system provides for computerized job tracking and billing. Karp et al. U.S. Pat. No. 6,154,727 concerns a system that tracks one or more service provider(s) as they visit assigned client sites, who may use a wireless phone device. Walsh et al. U.S. Pat. No. 6,144,848 relates to the use of hand-held devices that connect with a host computer. Other systems have been proposed for using a computer to generate contract proposals, reports, and job costs, e.g., in LeVander U.S. Pat. No. 6,216,108.

However, to date, no one has come up with an effective and efficient means for tracking and assigning customer service calls to field technicians, and automatically closing the order as the work is completed, billing the customer (or charging a customer account directly), and providing for payment to the technician. There has been no method available that automatically communicates between the central station and the technician using hand-held wireless units that display the appropriate customer information for the technician, and which also permit the technician to enter job completion and customer information, as well as time and equipment information for billing purposes, and which permit the technician to order replacement equipment using the hand held device, with the ordered equipment being automatically sent to the customer location (or other location, if desired), and automatically billing the customer for same. There has not been a systematic way of scheduling additional customer training, follow-on or rescheduled work, or follow-up, post service visits with customers, nor has there been a systematic way for the service technician to provide or deliver software, virus protection, data bases or Internet services.

OBJECTS AND SUMMARY OF THE INVENTION

Accordingly, it is an object of the present invention to provide a business method and an equipment arrangement which facilitate assigning customer-identified equipment, software, or Internet problems to available technician, tracking the service calls, and preparing billing reports, and which avoid the drawbacks of the prior art.

It is another object to provide a straightforward process in which there is a central dispatching office (which can be reached, e.g., by a dial-in "800"" number), with a main server computer, and in which all the technicians, over a wide geographical zone or over a number of zones, communicate with the main server computer over the Internet using a wireless, hand-held device with a visible display and keyboard or other input means.

It is a further object to provide a system that permits the technicians to see a list of service calls (or other appointments) in their own geographical area, and permits them to accept scheduled jobs that are unassigned.

It is a still further object to provide the system such that the technician can enter service call completion information, time on job and orders for replacement parts, using the hand-held device, and which automatically computes a customer bill or invoice, and provides for the customer a summary of billing data, also on the hand-held device.

According to an aspect of this invention, the assigning, tracking, and billing for calls for maintenance and repair for customer equipment, are handled automatically in a computerized network. A central dispatch office receives customer trouble calls, which can be phoned in or transmitted by e-mail or over the Internet, or via a customized integrated website, and any of a number of available technicians, in the same geographic location as the customer, can accept an assignment to clear the customer equipment problem. Each of the technicians has a hand-held wireless computing device that communicates wirelessly over a global information network, to wit, the Internet, with the main server computer at the central dispatch office. In the technique of this invention, customer requests for maintenance or repair are received at the central dispatch office. These can be handled by a telephone attendant, for example, who keys in the customer and equipment information into the main server computer, or automatically via website. For each such customer request, the customer information would include the identity and location of the customer, the nature of the problem the customer is experiencing, and customer billing account information, e.g., obtain credit card information or set up a customer account for automatic invoicing to the customer address. The main server computer automatically creates a service call entry for each such customer problem and creates a list of service calls with each service call having a customer location, customer identity, and nature of customer problem. The data can be expanded by the technician to include additional customer information, such as driving directions to the customer's facility. These job entries are communicated wirelessly over the Internet to the technician's wireless computing device. Preferably, each technician would receive the customer service calls for customers within the assigned geographic location for the respective technician. The wireless computing device has a keyboard or equivalent means (e.g., a handwriting recognition feature or a voice recognition feature) to permit the technician to enter data. The device also has an LCD or similar display screen. The wireless device shows, for the technician, a list of the service calls within the respective assigned geographical area. The technician selects one or more of the service calls presented on the hand held wireless computing device, and this lets the system know which jobs the technician accepts as an assignment to clear the associated customer problem.

The technician then signals that he or she is en route, and goes to the customer location. The system sends an e-mail to the customer that the technician is en route. Upon arrival, the technician lets the system know that he or she is on site, and there the technician can begin entering job completion information and labor charge data on the associated hand held wireless computing device, as the assignment is completed. These job completion data information and labor charge data are transmitted wirelessly over the Internet to the main server computer at the main office, i.e., dispatcher location. Then, the main server computer invoices and bills the customer for the completed work. Additionally, the technician payroll is automatically calculated.

The technician may also order any required hardware, software, or equipment items for delivery to the customer location. More specifically, the technician enters an identification of the hardware item on the hand-held wireless communication device while the device is displaying a customer screen for the associated customer service call. The hardware (or part item) identification is then transmitted wirelessly to the main server computer, and the main server computer then automatically transmits an electronic purchase request for the hardware (or software) item to a third-party supplier. The supplier then ships the hardware or other item(s) to the customer address (or other address specified), and debits the account of the repair and maintenance service. The software can be downloaded electronically to the customer site. The customer is automatically billed for this at the same time and in the same manner as for the technician's repair services.

The preferred wireless device provides a series of screens or video displays on its display screen. These screens can include a service call schedule showing the service calls available to the technician (in the technician's geographical area); a screen with customer name, address, and customer equipment problem for each said job entry; a screen for viewing and entering time and billing information for any such service call accepted by the technician; a screen for displaying the parts available; and a screen for viewing and entering equipment items to be ordered in connection with such service call. There can also be a customer billing screen displaying customer charges for completed work and ordered parts (i.e., software or equipment items) in connection with the associated service call, so that the technician can inform the customer of the charges to appear on an associated invoice. The series of screens on the hand held unit can also include a screen for permitting the technician to enter customer account information, with the wireless device transmitting such customer account data in encrypted form to the main server computer. Another screen permits the technician to accept a cash (or check, or credit-card-impressed invoice) payment from the customer, and log in the payment to the system. Various other screens can also be used for any applications in which a conventional system would use paperwork, forms, or catalogs.

The main server computer includes accounting software for computing compensation for each technician according to service calls completed and associated invoices paid.

The invention is directed to the system or equipment configuration as well, which carries out assigning, tracking, and billing for calls for maintenance and repair for customer equipment, e.g., computer equipment. A central dispatch office receives customer trouble calls, by phone or Internet, and any of a number of available technicians can accept the service call assignment to clear the customer equipment problem, usually depending on the geographical area. There is a central main server computer, and a number of hand-held wireless units, such that each technician has a hand-held wireless computing device. These devices connect wirelessly over the Internet with the main server computer at the central dispatch office, where the customer requests for maintenance or repair are received. The customer data are entered into the main server computer. For each such customer request, the customer information can include name, address, billing information, e.g., MasterCard or Visa account data, and nature of the problem the customer is experiencing. Then the main server computer includes software for automatically creating the service call, i.e., work order, for each such customer problem, and the server computer stores the resulting list of service calls. The hand-held units also contain software to generate the various screens that are presented on the viewing area of the hand held, so that the technician has the list of the service calls within the respective assigned geographical area. The software identifies when the technician selects one or more of the service calls on the hand held. The hand-held unit accepts data that the technician enters, such as service call completion data and labor charge data, and these data are transmitted wirelessly over the Internet to the main server computer.

The system of this invention permits the technician simply to respond to service calls identified on the hand held unit, and he or she does not need to be concerned about various back-office responsibilities, such as maintenance history, customer credit verification, customer satisfaction tracking, obtaining and tracking invoice payments, ordering of customer replacement parts and equipment, and so forth. For all data, complete wireless updates are available within minutes. All data are available by using simple, menu-driven look-ups and screens. At the same time, the customer enjoys rapid response, such as one-hour on-site technician repair service, with immediate service and billing information available on site, as well as immediate parts (including software) ordering and cost information.

This system permits independent, i.e., franchisee, participation by technicians, requiring only limited business knowledge and limited business experience.

The above and many other objects, features, and advantages of this invention will be more fully appreciated from the ensuing description of a preferred embodiment, which is to be read in conjunction with the accompanying Drawing.

BRIEF DESCRIPTION OF THE DRAWING

FIG. 3 is a top plan view of a hand-held portable wireless device as employed in an embodiment of this invention, showing a user input in the form of a miniature keyboard, and an LCD viewing screen, here showing the screen for user log-in.

FIGS. 4 to 17 are further views of the hand-held unit showing further screens as employed by the associated user in connection with this embodiment of the invention.

DETAILED DESCRIPTION OF THE PREFERRED EMBODIMENT

Figure 1:
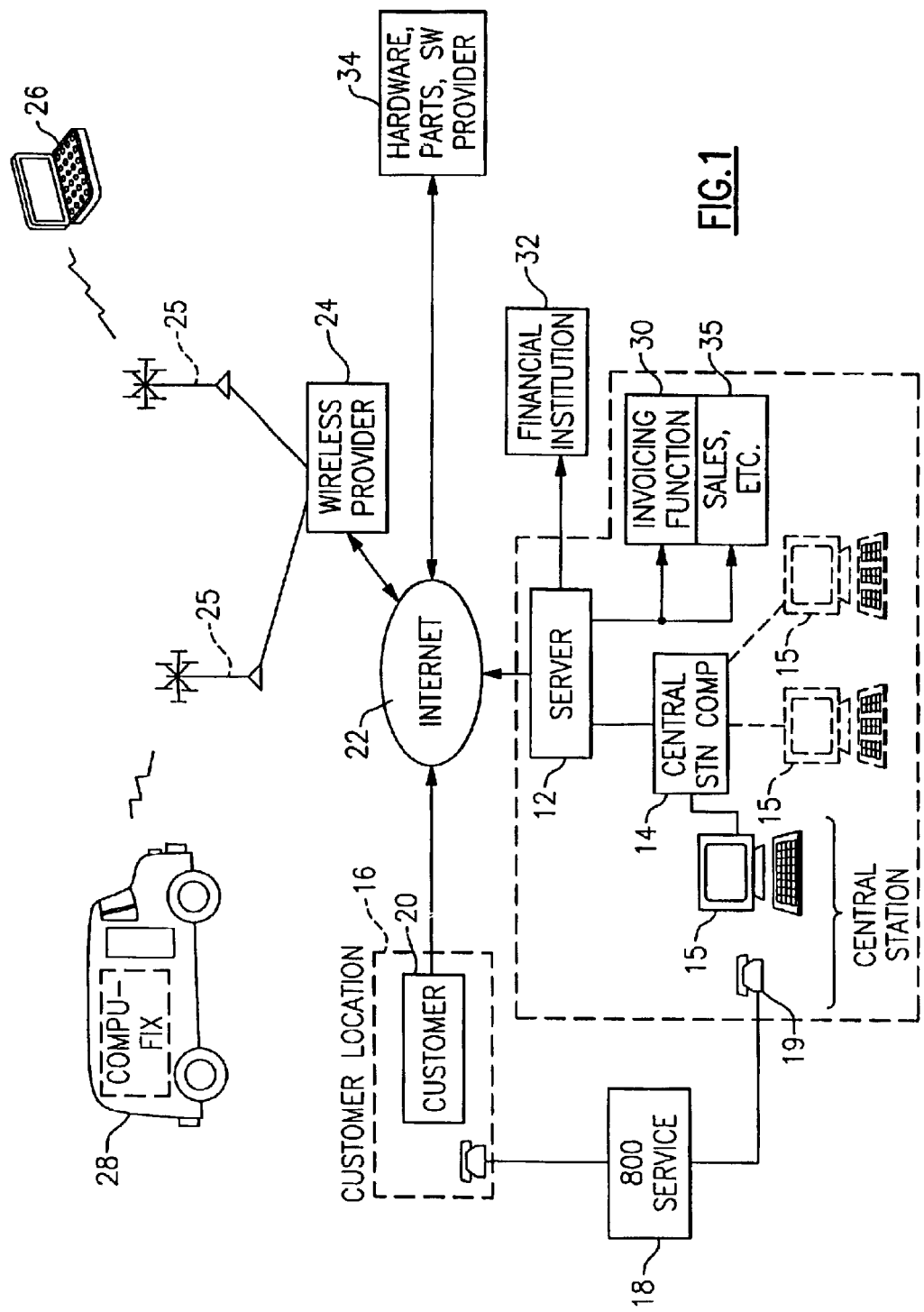
FIG. 1 is a general schematic view of the system of this invention for explaining the operation thereof.

With reference now to the Drawing, FIG. 1 thereof generally illustrates the system according to one embodiment of this invention, with a main office or central office 10 represented as a broken-line box. Here, a central main server computer 12 is coupled with one or more work station computers 14, which include an operator console 15. In a preferred arrangement, there is only a single home or central office 10 for a nationwide operation, but it is also possible that the central office could be somewhat distributed, i.e., with one or more of the consoles 15 being remotely located.

A typical customer location 16 is shown here schematically, with it being understood that there is no limit to the number and locations of customers. If the customer experiences some trouble or breakdown of the customer's equipment, e.g., computer or network equipment, or software, or Internet difficulties, then the customer may contact the central office 10 to call in and request technical service such as repair or maintenance. This may, for example, be by telephone request, using an "800" service 18, to reach an operator phone 19 at the central office 10. The customer may instead reach the central office from the customer's computer station 20 via Internet 24, in which case the information needed may be entered by the customer without operator intervention. In either case, the customer may be responding to a Yellow Pages listing, another advertisement or listing, or a notice on an Internet web site. The customer contacts the technical service provider, at the central office 10, to request assistance. The customer furnishes data such as identity and geographical location of the customer, customer credit and/or billing information, and the nature of the trouble that the customer is experiencing.

The main server computer 12 at the central office 10 communicates to outside technicians via the Internet 22, by communicating through one or another wireless provider 24, which can communicate wirelessly with technician hand-held communication devices 26, which will be described in some detail later. The service may also communicate directly with a communications device in the technician's vehicle 28. Cell towers 25 are illustrated generally here, but many possible means exist for communicating with the technicians' wireless devices.

Figure 2:
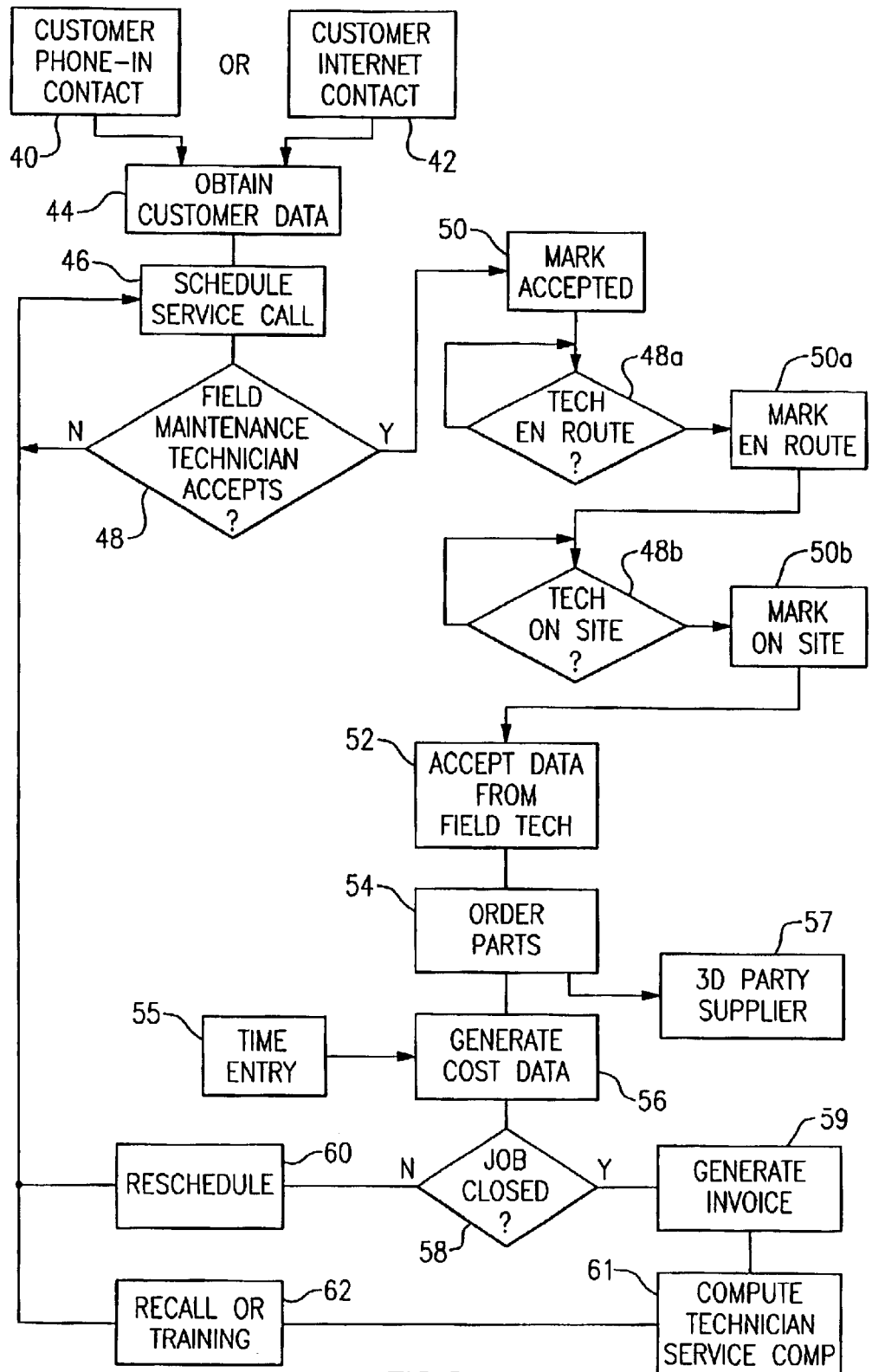
FIG. 2 is a logic flow chart for explaining the method according to an embodiment of the invention.

The main principles of the software for communicating between the technician hand-held units 26 and the main server computer 12 can be understood with reference to the general flow chart of FIG. 2.

Initially, the customer decides to ask the service provider for assistance in addressing some problem, e.g., to clear a computer problem in achieving access to a network. The customer may be an existing customer for whom the service provider has worked previously, or may be a new customer who finds out about the service provider from the Yellow Pages, an Internet web page, or in many cases, from another customer. The customer then contacts the service provider, for example by phoning the "800" number to reach an operator at the service provider's main office or central office 10, as indicated in block 40. Alternatively, the customer may contact the service provider electronically over the Internet (block 42), either by sending an e-mail, or more favorably, by sending a service request directly to the main server computer 12 via an Internet connection from the customer's computer 20. In either event, the customer is asked to provide information including customer identification data (block 44), i.e., name and address, with driving directions, as appropriate (these can be automatically generated from the Internet), a description of the customer equipment and the problem the customer is experiencing (i.e., "PC computers will not connect with network"), and customer billing information. The latter may include credit card or debit card data (e.g., Master Card or Visa). When the customer data intake is complete, the main server computer 12 automatically generates a customer work order or service call (block 46) and posts the same with other service calls in a list showing the customer name and location, nature of problem, time and date of intake, and which technician has accepted the job, if any. Because the customers can be located anywhere in a wide geographical region, and all calls can be taken by a single central office 10, the service calls may favorably be classified by geographical zone, so that technicians within any respective geographical zone will be presented with the service calls that emanate from that geographical zone, and those service calls will be the ones normally listed on their hand held units 26. The field technician can view the list of service calls presented on the hand held unit 26, and can accept any that he or she is willing to work (block 48), this being done by scrolling and clicking on a specific screen on the unit 26. Once the technician accepts a given service call (block 48), the main server computer marks that service call as accepted (block 50). If the job is not accepted by any technician, the service call remains listed as not accepted. The technician also signals when he is en route (block 48a) and when he has arrived (block 48b), so the system is aware of the status of the technician and can inform the customer (e.g., via e-mail). The system marks the listing on the service call list as "en route" (block 50a) and as "on site" or arrived (block 50b).

If the technician accepts a given service call, then the technician can scroll through various screens on the hand held unit 26, and expand on certain fields on the screen, to gain information about the customer and the particular equipment problem involved. This permits the technician to view the address and driving direction for that customer, so the technician can contact the customer, as necessary. This can be by phone call or e-mail, or can simply involve having the service provider (i.e., main office) contact the customer to indicate that a technician is under way.

When the technician arrives at the customer location, the technician works to clear the equipment or software problem. The technician enters the time spent and other data on the hand held unit 26, and this is transmitted wirelessly over the Internet 22 to the main server computer 12. The server accepts the data from the field technician (block 52), and generates a work record of the call. If replacement equipment, parts, or software are needed at the customer location, e.g., a replacement serial cable, or modem, the technician can order this directly by entering the request on the hand held unit 26. The main server computer then accepts this request (block 54), and generates a message to be sent to a cooperating third-party equipment supplier or provider 34 (block 57). The third party provider then automatically packages and ships the requested equipment to the customer address (or to the technician address, as appropriate). The provider 34 by pre-arrangement, then charges the service provider a predetermined amount for that part or piece of equipment, and the main server computer includes this amount, plus a pre-determined mark up, to the invoice data for the service call. The main server computer has an invoicing functionality 30 that can generate a customer invoice for the particular service call (block 56), to include technician service time (times hourly rate—block 55), charges for parts ordered, and miscellaneous charges (e.g., mileage) as appropriate. The technician can then indicate on the hand held unit 26 that the job is completed or closed (block 58), and the main server computer 12 generates a customer invoice (block 59) at a scheduled time, e.g., after midnight or at the beginning of the following day, with all the customer invoices being mailed out in the following day's mail. Alternatively, for those customers that want direct billing against a financial account, such as a credit card, the main server computer may send the customer invoice information directly to a financial institution 32. In that case a paid invoice may be sent to the customer, by postal mail or E-mail. In the event that the service call is not completed at that call, the technician so indicates on the hand held unit 26, and further work on the job may be re-scheduled (block 60). The server computer 12 can have a sales, follow-on, and customer contact maintenance functionality 35, as discussed later. The system automatically computes technician compensation (block 61) and can schedule follow-on, recall visits, or customer training sessions (block 62).

All the posted service calls and their status can be viewed at the central office on a computer screen which identifies both the customer and the technician accepting the service call, as well as other customer and financial information, as needed. If desired, the system can be configured so that the entire list of service calls can be viewed at any of multiple locations.

Figures 3, 4:
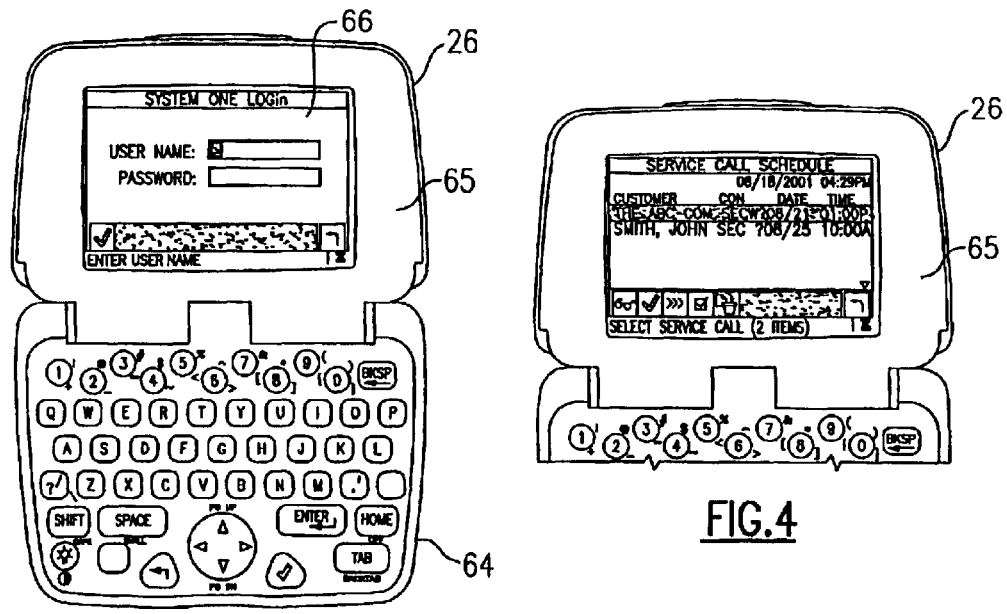
Figures 5, 6:
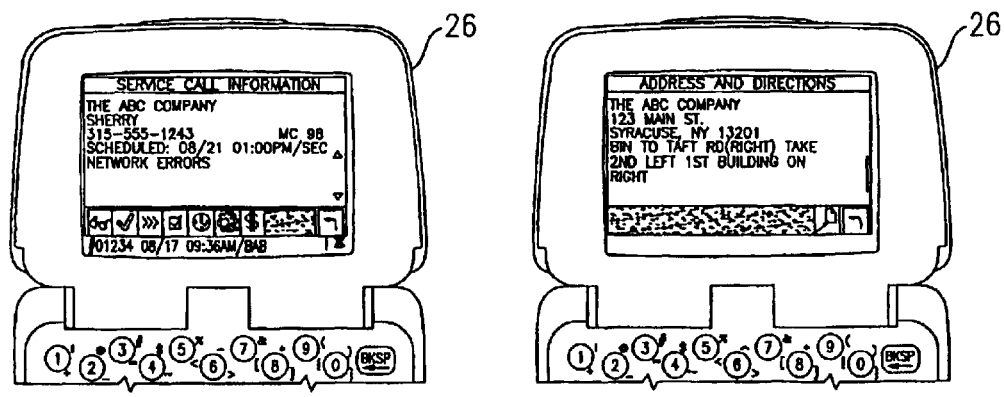
Figure 8:
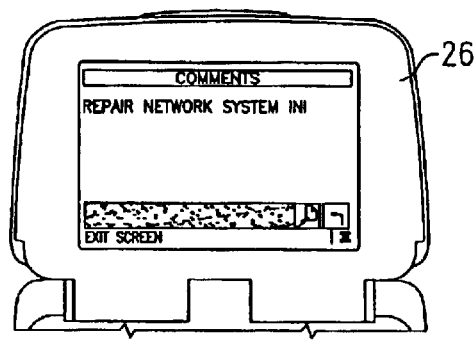

The hand-held unit 26 as employed in the system of this embodiment is shown in FIG. 3, and various screens that are displayed on the hand-held unit are also shown in this view and in the following FIGS. 4 to 17.

The hand held unit 26 has a palm-size body 64 with a keyboard 65, which the technician can easily manipulate, e.g., using his or her thumbs. There is also a fold-down LCD screen section 66, which permits the technician to interact with the main server computer. In FIG. 3, the screen section 66 is displaying a sign-in or log-on screen, and prompts the technician to enter his or her user name and a password. Entry of these data allow the technician to view the following screens, and to enter data.

FIG. 4 shows a Service Call Schedule screen, which lists the service calls for customers in the geographic zone for the given technician, and here displays two lines, one for each current service call. Each line lists a customer name, consultant initials and the date and time of the service call. The technician can scroll to a desired one of these, and click to expand the information, resulting in the screen shown in FIG. 5. The expanded screen shows the customer name (The ABC Company), customer contact name ("Sherry"), customer telephone, and predetermined payment method and rate, as well as the time and date scheduled, and the nature of the customer problem ("Network Errors"). From here, the technician can scroll to an Address and Directions screen (FIG. 6) to gain driving instruction for reaching the customer location. Again at the service call schedule or information screen (FIG. 4), to mark "en route" or "in progress" the technician can scroll over to an "accept" icon (√), and click or push "enter" to accept the assignment of that particular service call. The technician can also press or click on an "arrived" icon when he or she arrives at the customer site.

Figure 7:
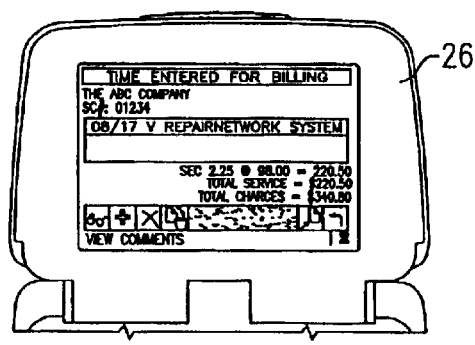
Figure 9:
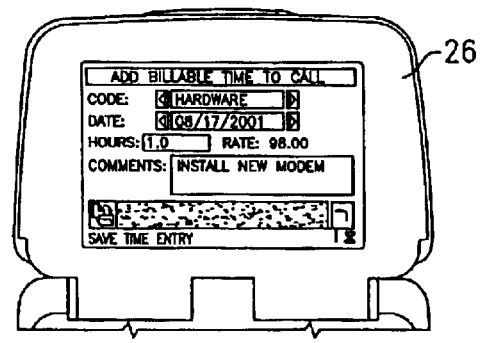
Figure 10:
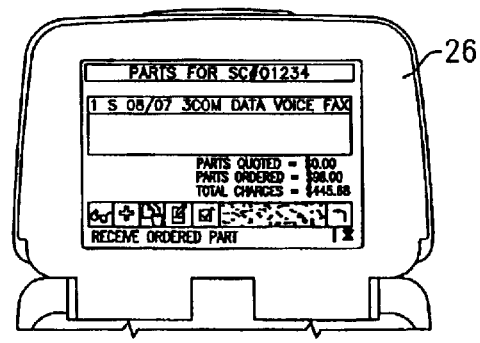
Figure 11:
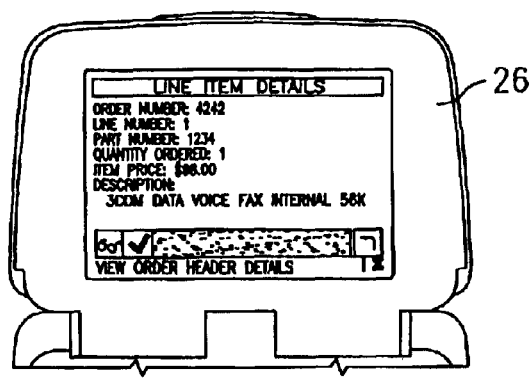
Figure 12:
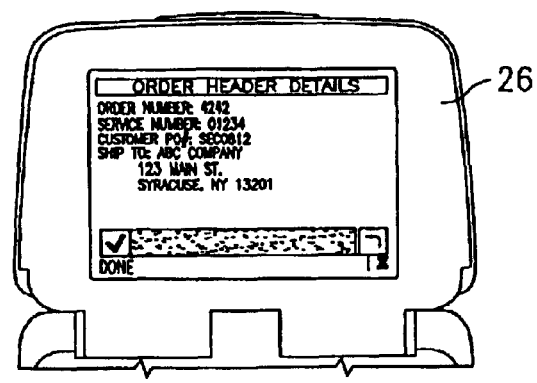
Figure 13:
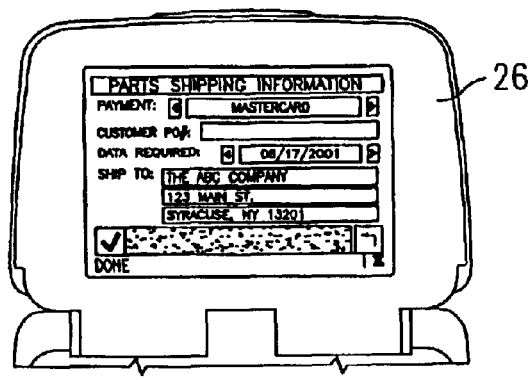
Figure 14:
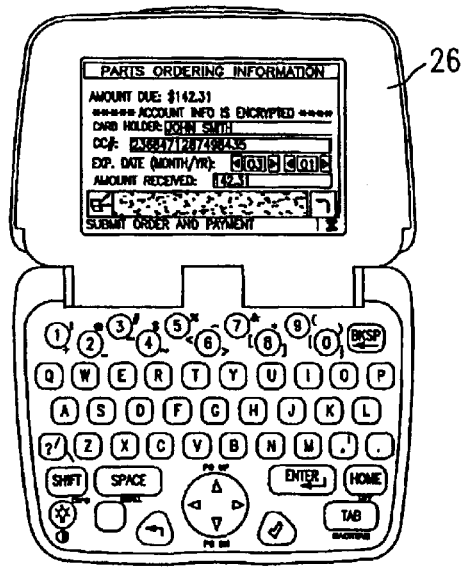
Figure 15:
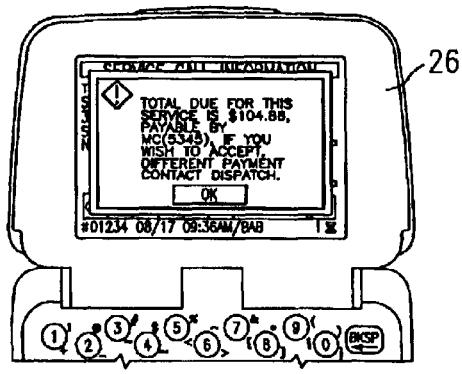
Figure 16:
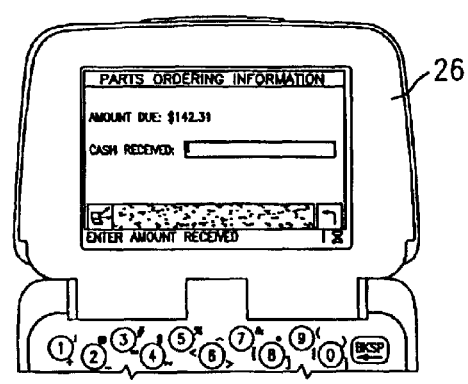
Figure 17:
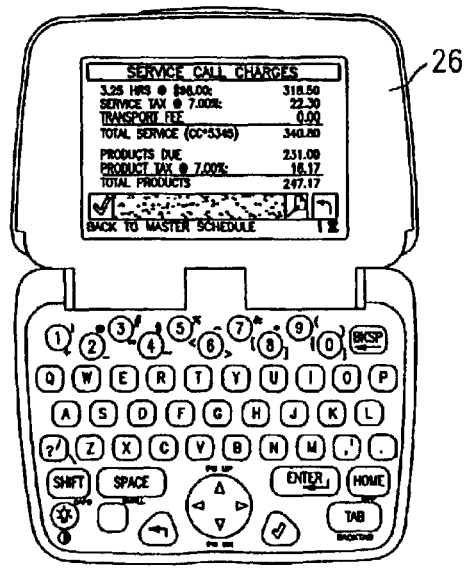

When the technician arrives at the customer location, and is about to commence work on the customer problem, he or she can scroll to a Time Enter for Billing screen (FIG. 7). This screen displays the technician billing rate and the amount of technician time consumed. A Comments screen (FIG. 8) can be reached from this screen, and allows viewing of comments of past time entries. The Comments screen permits the technician to enter comments about the customer's problem and the work that is being done to correct it.

Other screens can be used for new time entries. The technician reaches an Add Billable Time to Call screen (FIG. 9) which prompts entry and shows a display of repairs made (e.g., "hardware"), date, billable time, and comments, with the data being what was entered on the other screens discussed before. The technician is prompted to save the time entry for billing purposes. If parts or equipment (or software) are needed to service the customer, the technician can reach a Parts screen (FIG. 10) which allows the technician to order the required part or parts. As discussed before, the parts order is handled automatically by the main server 12, and the parts are ordered, without operator intervention, from an equipment supply house and shipped to the customer location (or optionally to the technician location). The particular parts item has a customer price that is displayed on this screen, and the screen also displays Total Charges, which includes the technician time. This screen can be expanded to bring up a Line Item Details screen (FIG. 11), showing details of the part number, quantity ordered, item price, and description of the part. If this is correct, the technician can bring up an Order Header Details screen (FIG. 12), and verify the shipping address and other customer information. The technician can accept the data, or may change details after bringing up a Parts Shipping Information screen (FIG. 13), which has boxes for entry of payment information, e.g. MasterCard, date and customer address data. A Parts Ordering Information screen (FIG. 14) permits the technician to enter payment data including card holder name, card or account number, expiration date, and total amount, if different from default values from previous screens. The hand-held unit also has a screen for showing the customer the total amount due on a particular transaction to the credit card account (FIG. 15), so that if there is a problem the dispatch operator at the central main office 10 can be contacted. There is also the option for cash (or check) payment from the customer directly to the technician, and a Cash Received screen (FIG. 17) permits the technician to enter the amount paid by the customer. The technician can also accept payment by taking an impression of the customer credit card, and then sending the card-impressed invoice, with all required comments and entries, to the main office.

Finally, a summary of total charges in connection with the technician's service call are displayed on a Service Call Charges screen (FIG. 17) including charges for technician billed time, sales or service tax, as appropriate, travel or transportation, as appropriate, and products (i.e., parts) plus applicable taxes.

At the end of a service call, the technician returns the hand held unit to the Master Service Call Schedule screen (FIG.

3). There are also many other screens that may be provided, e.g., to obtain information from or send information to the main office. The data from each screen are transferred between the hand held units 26 and the main server 12 by means of an E-mail technique, and preferably these data are encrypted using a proprietary protocol for communications. The main server computer preferably has accounting software for crediting each technician for work that is completed and paid for, and commission or other credit for parts and equipment delivered and paid for. Technician payroll is computed automatically at the main or central office.

Figure 18:
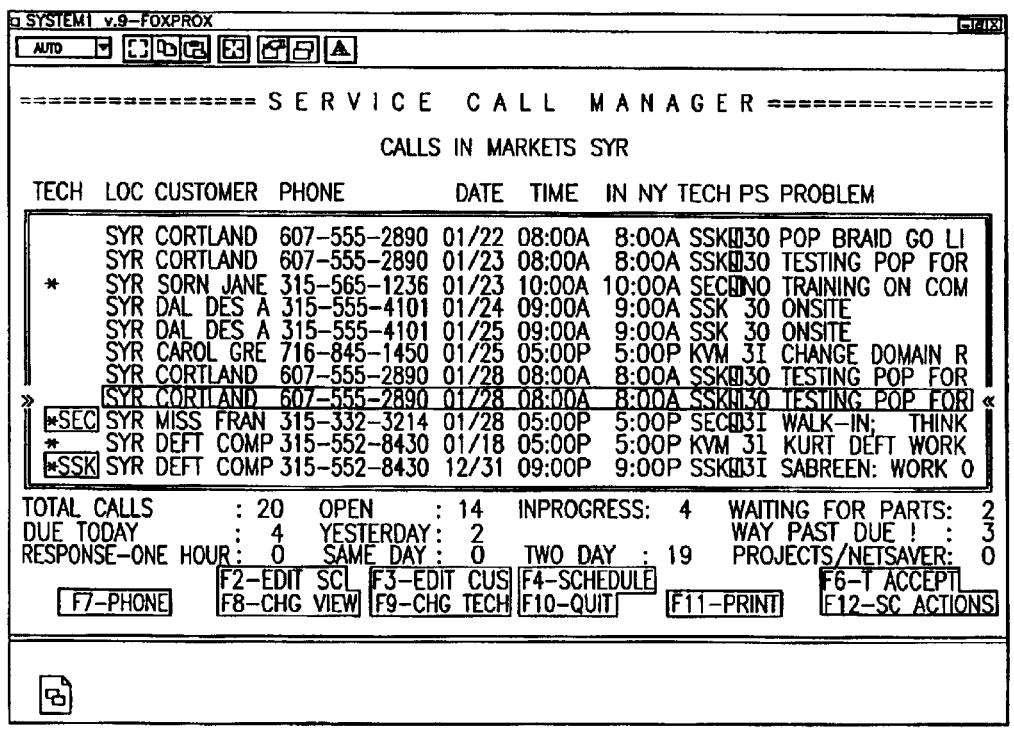
FIG. 18 is a screen that appears at the main office dispatcher's computer, showing a list of customer service calls, assigned technician identification, and problem status.

At the main or central office 10, the main server computer 12 can provide information to the dispatcher, e.g., as one or more screens, e.g., as illustrated in FIG. 18, showing the dispatcher the status of the service calls for any geographical region (here shown for a Syracuse N.Y. region) or for an all-encompassing zone, e.g., nationwide. Here each line indicates the customer regional location, the customer name, phone number, date and time of service call scheduling, identity of the technician accepting the service call, and a brief description of the customer problem. The term "onsite" here indicates that the technician has arrived at the customer location. A summary of the listed service calls is also provided on this screen for management and supervisory purposes.

In this system, the technician can contact the dispatcher any time he or she has a question, either by using the hand-held unit 26 or by dialing in on the "800" phone number.

The hand-held units 26 also provide customer contact maintenance features, as illustrated, for example, in FIGS. 19 to 28, for increasing the quality of technical service to the customer and for increasing customer satisfaction. Often other services may be needed beyond servicing the specific customer-identified problem that was the subject of the service call, and the technician should make sure that the customer is aware of these. The customer should be informed of the opportunity to schedule employee training as that may increase employee work efficiency. Accordingly, the hand-held units provide means for re-scheduling, for call backs, for scheduling additional meetings, and for scheduling training. The customer can have the technician schedule follow-up service (on the hand-held unit 26), or alternatively the customer can call in to the dispatcher to schedule (or reschedule) follow-up or training.

Figure 19:
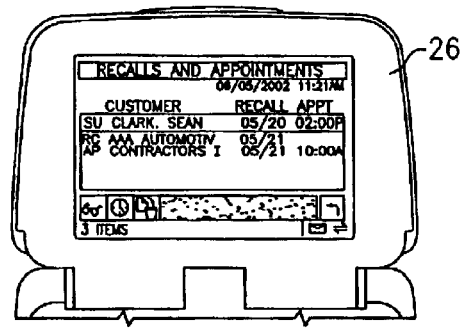
FIGS. 19 to 28 are views of screens of the hand-held unit which can be employed in customer contact maintenance activities.
Figure 20:
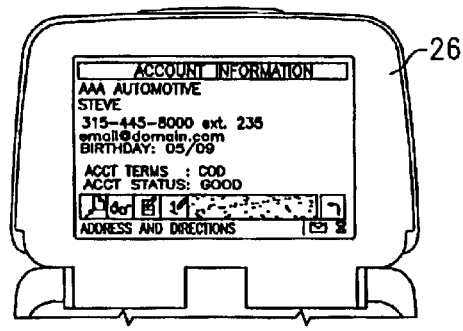
Figure 21:
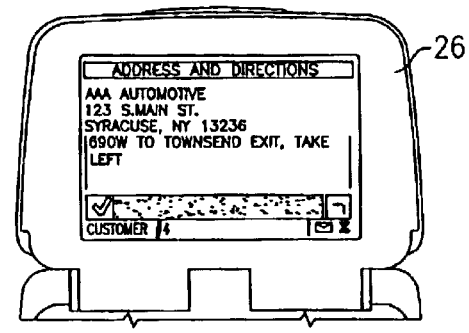
Figure 22:
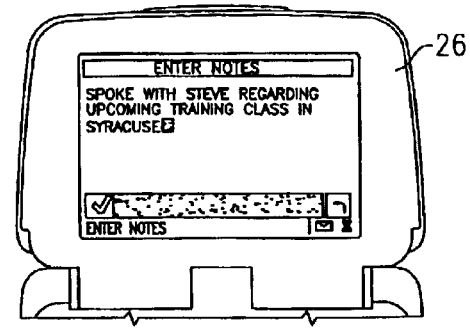

FIG. 19 shows the hand-held unit 26 displaying a Recall and Appointments screen, which lists the technician's service calls (SV), and appointments (AP), and also indicates a recall (RC) for a customer identified as "AAA Automotive." The recall entry can be expanded to the screen shown in FIG. 20, to display customer contact information, including contact name, telephone number, other contact information, and personal data (such as birthday of the contact person). This screen also shows the previously established account terms for this customer plus account status.

The technician can reach an Address and Driving Directions screen (FIG. 21), which are automatically generated from the Internet, and represent the driving directions from the technician's present location.

Figure 23:
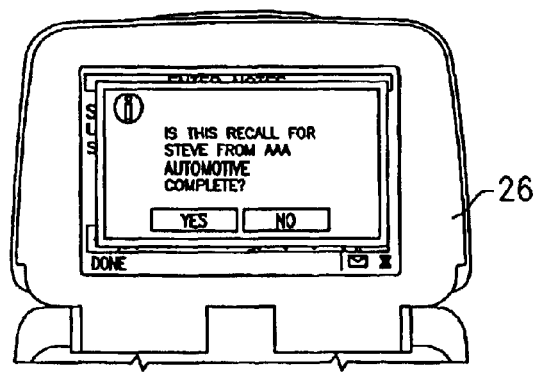
Figure 24:
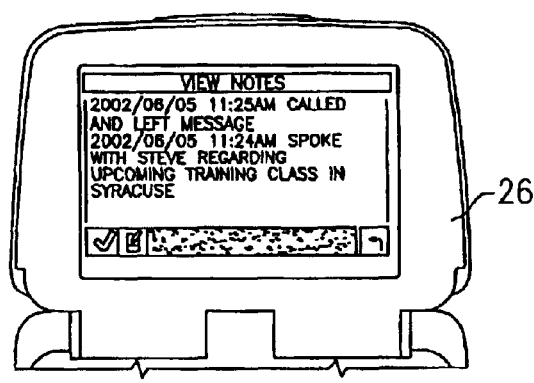
Figure 25:
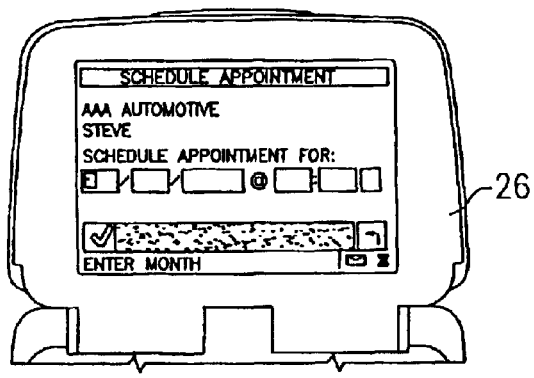
Figure 26:
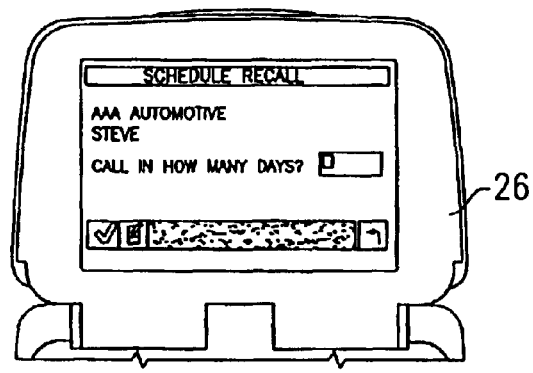
Figure 27:
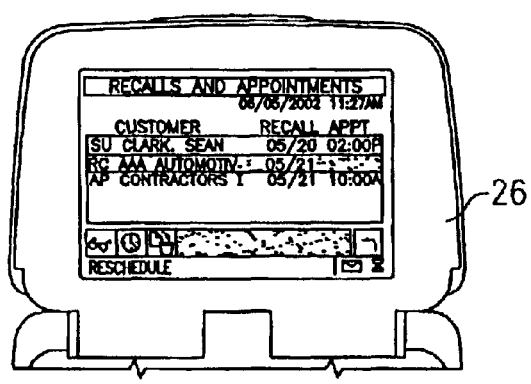

During a service call with the customer, or during a recall or follow-up visit, the technician can use an Enter Notes screen (FIG. 22) to record discussions with the customer about follow up items, such as additional training, or other items that the technician has uncovered during the service call or on a recall visit. The technician is trained to inform the customer that other services, such as training sessions, are available. When the technician clicks on the √icon, a dialog box is displayed, as shown in FIG. 23, so that the technician can confirm that this is a scheduled recall for this customer and that the recall has been completed. The technician can click on the appropriate box, here YES or NO, to enter the data into the system, and the technician's note will then appear on the View Notes screen (FIG. 24).

Figure 28:
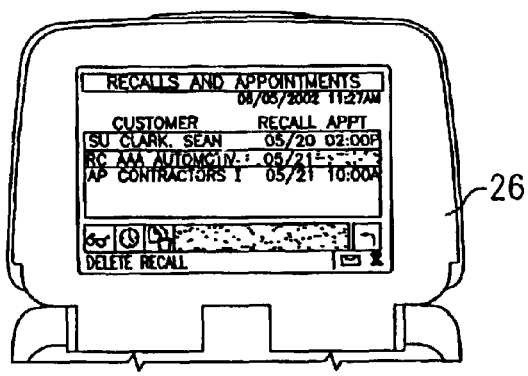

A Schedule Appointments screen (FIG. 25) allows the technician to type in the date and time for a follow-on appointment where desired, and a Schedule Recall screen (FIG. 26) allows the technician to indicate follow up is needed or desired in a number of days that are entered in the box as shown. The system already has the technician's schedule and can sandwich the recall in between other appointments and accepted service calls. The Recalls and Appointments screen (FIG. 27) here lists the scheduled recall "RC", which can be reached from this screen. The other items, such as service calls "SV" and appointments "AP" are listed here for purposes of blocking out time, but are not accessed from this screen. The technician can scroll down to the recall entry for AAA Automotive in this example, e.g., to delete the recall if it is completed or if the customer wants to defer to another time (FIG. 28).

Many other customer service and contact maintenance features are possible in addition to those shown here.

Rather than the hand-held units 26 as illustrated above, it is also possible to employ other types of wireless hand held devices, such as a PDA-type units, which may have handwriting recognition technology, with the technician entering the required data using a stylus. The invention has been explained with reference to technology that is preferred at this time, but it is possible to use other technology, either now in existence, or later developed.

While the invention has been described with reference to a specific preferred embodiment, the invention is certainly not limited to that precise embodiment. Rather, many modifications and variations will become apparent to persons of skill in the art without departure from the scope and spirit of this invention, as defined in the appended claims.

I claim:

1. Method of assigning, tracking, and billing for calls for maintenance and repair for customer equipment located at a customer premises, in which a central dispatch office receives customer trouble calls, and any of a plurality of available technicians accept an assignment to clear the customer equipment problem, with each of said technicians having a wireless computing device that communicates wirelessly over a global information network with a main server computer at the central dispatch office; the method comprising;

receiving customer requests for maintenance or repair at the central dispatch office;

entering into the main server computer, for each such customer request, customer information including identity and location of the customer, nature of the problem the customer is experiencing, and customer billing account information;

said main server computer automatically creating a service call entry for each such customer problem and creating a list of said service call entries with each having a customer location, customer identity, and nature of customer problem;

communicating wirelessly over said global information network to the wireless computing devices the customer service calls for customers within the assigned geographic location for the respective technicians; each said wireless computing device having a display screen and means to permit the technician to enter data;

listing for each technician on the respective wireless computing device a list of the service calls within the respective assigned geographical area;

said technician viewing said list of service call entries on the hand held wireless computing device and selecting one or more of the service calls presented on the wireless computing device on which the technician accepts an assignment to clear the associated customer problem;

the hand held wireless computing device transmitting acceptance of the one or more service call entries wirelessly back to said main computer;

said technician visiting said customer premises;

said technician entering job completion data and labor charge data on the associated wireless computing device as the assignment is completed, said job completion data and labor charge data being transmitted wirelessly over said global information network to said main server computer; and said main server computer automatically invoicing and billing said customer for the completed work.

2. Method of assigning, tracking, and billing for calls for maintenance and repair for customer equipment according to claim 1, further comprising ordering and delivering a merchandise item to the customer location, including the technician entering an identification of the item on the wireless communication device while the device is displaying a customer screen for the associated customer service call entry; said merchandise item identification being transmitted wirelessly therefrom to said main server computer; and said main server computer transmitting a purchase request, with an associated customer delivery address, for the merchandise item so identified to a third-party supplier.

3. Method of assigning, tracking, and billing for calls for maintenance and repair for customer equipment according to claim 2, wherein said step of main server computer automatically invoicing and billing includes entering a charge for purchase and delivery of the merchandise item to be included on the customer invoice.

4. Method of assigning, tracking, and billing for calls for maintenance and repair for customer equipment according to claim 2, wherein said merchandise item includes software; wherein said software is delivered to the customer equipment by downloading the same to the customer equipment, and the purchase for such software is completed and paid for by the customer during the visit of the technician to the customer premises.

5. Method of assigning, tracking, and billing for calls for maintenance and repair for customer equipment according to claim 1, said wireless device of each technician providing a series of screens on its display screen including a service call schedule showing the service calls available to the technician; a screen with customer name, address, and customer equipment problem for each said service call; a screen for entering time and billing information for any such service call accepted by the technician; and a screen for entering equipment and software items to be ordered in connection with such service call.

6. Method of assigning, tracking, and billing for calls for maintenance and repair for customer equipment according to claim 5, said series of screens further including a customer billing screen displaying customer charges for completed work and ordered equipment items in connection with the associated service call, so that the technician can inform the customer of the charges to appear on an associated invoice.

7. Method of assigning, tracking, and billing for calls for maintenance and repair for customer equipment according to claim 6, wherein said series of screens on said hand held unit includes a screen for permitting the technician to enter customer account information, said wireless device transmitting said customer account data in encrypted form to said main server computer.

8. Method of assigning, tracking, and billing for calls for maintenance and repair for customer equipment according to claim 1 in which the main server computer includes accounting software and the method further comprising said main server computer automatically computing compensation for each said technician according to service calls completed and reported back via said hand held wireless computer devices and according to the associated invoices paid.

9. Method of assigning, tracking, and billing for calls for maintenance and repair for customer equipment according to claim 1 in which said technician accepts cash payment from said customer, and in which said method further comprising said wireless device providing a screen to permit the technician to enter cash payment data representing the cash payment received, said cash payment data being transmitted wirelessly from said hand held wireless device to said main server computer.

10. Method of assigning, tracking, and billing for calls for maintenance and repair for customer equipment according to claim 1 further comprising said wireless device providing said technician with one or more screens for scheduling follow-on work with said customer in connection with the associated service call and said wireless device wirelessly transmitting scheduled follow-on work data to said main server computer.

11. Method of assigning, tracking, and billing for calls for maintenance and repair for customer equipment according to claim 1 in which each said wireless computing device is a palm-sized hand held computing device.

12. System for assigning, tracking, and billing for calls for maintenance and repair for customer equipment, in which a central dispatch office receives customer trouble calls, and any of a plurality of available technicians accept an assignment to clear the customer equipment problem at a premises of the customer, comprising:

a plurality of hand-held wireless computing device each respectively assigned to an associated one of said technicians and which communicates wirelessly over a global information network;

a main server computer at the central dispatch office; the main server computer being adapted for receiving customer requests for maintenance or repair; including, for each such customer request, customer information including identity and location of the customer, nature of the problem the customer is experiencing, and customer billing account information; said main server computer automatically creating a service call entry for each such customer problem and creating a list of service calls with each having a customer location, customer identity, and nature of customer problem; and said main server computer being adapted for communicating wirelessly over said global information network to the wireless computing devices the customer service calls for customers within the assigned geographic location for the respective technicians; each said wireless computing device having a display screen and means to permit the technician to enter data;

said hand held wireless computing devices each being adapted for displaying a list of the service calls within the respective assigned geographical area of the associated technician, and permitting said technician to accept one or more of the service calls presented on the associated hand-held wireless computing device, the hand held wireless computing device being adapted for transmitting the acceptance of the one or more service calls wirelessly back to said main server computer; and being further adapted to permit said technician to enter thereon job completion data and labor charge data while at customer premises; said job completion data and labor charge data being transmitted wirelessly over said global information network to said main server computer; and said main server computer being adapted for automatically invoicing and billing said customer for the completed work.

13. System according to claim 12 said main server computer being further adapted for transmitting a software order over said global communications network to a software supply house for ordering software to be downloaded to the customer equipment of said customer while the technician is at the customer premises, and obtaining payment from said customer.

14. System according to claim 12 said hand-held devices providing one or more screens permitting the technician to enter follow-on and recall data associated with one of said service calls said hand held device then transmitting said follow-on and recall data wirelessly to said main server computer.

15. Method of assigning, tracking, and billing for calls for maintenance and repair for customer equipment according to claim 1, wherein said hand held wireless device signals wirelessly to said main server computer when said technician is enroute to the customer premises and when the technician has arrived on the customer premises as technician status data, and said main server computer maintains said technician status data.

16. Method of assigning, tracking, and billing for calls for maintenance and repair for customer equipment according to claim 15, wherein said main server computer automatically communicates the status data for the technician to the customer when said technician is enroute to the customer premises and when the technician has arrived at the customer premises.

* * * * *